(12) United States Patent
Muramatsu et al.

(10) Patent No.: US 9,475,920 B2
(45) Date of Patent: Oct. 25, 2016

(54) CARBON FIBER-REINFORCED POLYPROPYLENE SHEET AND MOLDED ARTICLE THEREOF

(71) Applicant: TORAY INDUSTRIES, INC., Tokyo (JP)

(72) Inventors: Hidetaka Muramatsu, Masaki (JP); Noriyuki Hirano, Masaki (JP)

(73) Assignee: Toray Industries, Inc., Tokyo (JP)

( * ) Notice: Subject to any disclaimer, the term of this patent is extended or adjusted under 35 U.S.C. 154(b) by 91 days.

(21) Appl. No.: 14/371,247

(22) PCT Filed: Nov. 16, 2012

(86) PCT No.: PCT/JP2012/079731
§ 371 (c)(1),
(2) Date: Jul. 9, 2014

(87) PCT Pub. No.: WO2013/105340
PCT Pub. Date: Jul. 18, 2013

(65) Prior Publication Data
US 2014/0357777 A1 Dec. 4, 2014

(30) Foreign Application Priority Data
Jan. 10, 2012 (JP) .................... 2012-001810

(51) Int. Cl.
| | |
|---|---|
| C08J 5/06 | (2006.01) |
| C08K 7/06 | (2006.01) |
| B29B 11/16 | (2006.01) |
| C08L 23/10 | (2006.01) |
| C08J 5/04 | (2006.01) |
| C08J 5/18 | (2006.01) |
| C08L 23/12 | (2006.01) |
| C08K 3/04 | (2006.01) |

(52) U.S. Cl.
CPC ............ *C08K 7/06* (2013.01); *C08J 5/042* (2013.01); *C08J 5/18* (2013.01); *C08L 23/12* (2013.01); *C08J 2323/10* (2013.01); *C08J 2451/06* (2013.01); *C08K 3/04* (2013.01)

(58) Field of Classification Search
CPC ............ C08K 7/06; C08J 5/06; C08L 23/10; B29B 11/16
USPC ............................................ 524/495
See application file for complete search history.

(56) References Cited

U.S. PATENT DOCUMENTS

2012/0015186 A1* 1/2012 Honma ............... B29C 45/0001
428/375
2013/0234361 A1* 9/2013 Tsuchiya ................. C08J 5/042
264/257

FOREIGN PATENT DOCUMENTS

WO WO2011/093297 * 8/2011

* cited by examiner

*Primary Examiner* — James J. Seidleck
*Assistant Examiner* — Deve E Valdez
(74) *Attorney, Agent, or Firm* — Kubovcik & Kubovcik

(57) ABSTRACT

The present invention relates to a carbon fiber-reinforced polypropylene sheet which comprises carbon fibers having a weight-average fiber length of 1.5 mm to 20 mm and a matrix resin composed of a polypropylene and an acid-modified polypropylene, wherein the carbon fibers are dispersed in the form of single fibers and the interfacial shear strength between the carbon fibers and said matrix resin is 5.50 to 10.5 MPa. Provided is a carbon fiber-reinforced polypropylene sheet for obtaining a molded article having excellent mechanical properties and impact resistance, which carbon fiber-reinforced polypropylene sheet comprises discontinuous carbon fibers and a polypropylene, can be molded into a complex shape and has isotropic mechanical properties.

9 Claims, No Drawings

CARBON FIBER-REINFORCED POLYPROPYLENE SHEET AND MOLDED ARTICLE THEREOF

TECHNICAL FIELD

The present invention relates to a carbon fiber-reinforced polypropylene sheet and a molded article thereof.

BACKGROUND ART

Carbon fiber-reinforced plastics (hereinafter, referred to as "CFRPs"), because of being lightweight and having excellent mechanical properties, have an impressive track record in the sporting materials such as golf club shafts, fishing rods and rackets as well as in the aircraft applications. In recent years, CFRPs have been increasingly applied also in the industrial fields of windmill blades, pressure containers, reinforcing construction materials and the like. Furthermore, in the automobile applications where the development of electric vehicles has been intensified and weight reduction is increasingly demanded, CFRPs are drawing much attention.

Conventionally, in CFRPs, because of the demand for high mechanical properties, thermosetting resins such as epoxy resins have been mainly used. However, in recent years, CFRPs using a thermoplastic resin that has a rapid processing cycle and excellent productivity have been actively studied. In particular, CFRPs in which polypropylene that is lightweight and inexpensive and has excellent water resistance and chemical resistance is used as a matrix resin (hereinafter, referred to as "thermoplastic CFRPs") are expected to be widely used in the industrial applications.

Thermoplastic CFRPs generally assume the form of, for example, a compound pellet for injection molding or a sheet for stamping molding. In particular, a thermoplastic CFRP sheet using discontinuous fibers has excellent productivity and shapability and is thus a material form that attracts attention mainly in the industrial applications.

PRIOR ART DOCUMENTS

Patent Documents

Patent Document 1 discloses a sheet-form material in which a sheet composed of discontinuous reinforcing fibers having a specific fiber length distribution is impregnated with a thermoplastic resin. Further, Patent Document 2 discloses a sheet-form material in which randomly-oriented chopped strands are impregnated with a thermoplastic resin. Molded articles using the thermoplastic CFRP sheets disclosed in these documents show excellent mechanical properties.

Patent Document 3 discloses a material for press molding which has an improved adhesion between discontinuous carbon fibers and a thermoplastic resin and exhibits good mechanical properties and impact resistance.

[Patent Document 1] JP 2010-235779A
[Patent Document 2] WO 2007/020910
[Patent Document 3] JP 2008-169344A
[Patent Document 4] JP 2010-150358A
[Patent Document 5] JP 2002-3616A

Non-Patent Documents

[Non-patent Document 1] Chiang W. Y. and Huang C. Y., Composites Polymer, 4 (1991), 251.

[Non-patent Document 2] Drzal, L. T., Mater. Sci. Eng. A126 (1990), 289.

SUMMARY OF THE INVENTION

Problems to be Solved by the Invention

The molded articles using the thermoplastic CFRP sheets according to Patent Documents 1 and 2 show a brittle fracture behavior; therefore, an improvement in the impact resistance is desired.

The material for press molding according to Patent Document 3 is also not considered to have sufficient impact resistance.

An object of the present invention is to provide a discontinuous carbon fiber-reinforced polypropylene sheet which has an excellent balance of impact resistance and mechanical properties. More particularly, an object of the present invention is to provide: a discontinuous carbon fiber-reinforced polypropylene sheet which has both excellent mechanical properties and high impact resistance; and a molded article thereof.

Means for Solving the Problems

In order to solve the above-described problems, the carbon fiber-reinforced polypropylene sheet of the present invention has the following constitution. That is, the carbon fiber-reinforced polypropylene sheet of the present invention is one which comprises carbon fibers having a weight-average fiber length of 1.5 mm to 20 mm and a matrix resin composed of a polypropylene and an acid-modified polypropylene, wherein the carbon fibers are dispersed in the form of single fibers and the interfacial shear strength (IFSS) between the carbon fibers and the matrix resin is 5.50 to 10.5 MPa.

Further, the molded article of the present invention has the following constitution. That is, the molded article of the present invention is one which is obtained by molding the above-described carbon fiber-reinforced polypropylene sheet.

In the carbon fiber-reinforced polypropylene sheet of the present invention, it is preferred that the matrix resin comprise the acid-modified polypropylene in an amount of 0.1 to 5% by mass.

In the carbon fiber-reinforced polypropylene sheet of the present invention, it is preferred that the carbon fibers contained therein comprise 20% by mass to 75% by mass of carbon fibers having a length of greater than 5 mm and 1.0% by mass to 25% by mass of carbon fibers having a length of less than 2 mm.

In the carbon fiber-reinforced polypropylene sheet of the present invention, it is also preferred that the carbon fibers contained therein comprise 50% by mass to 70% by mass of carbon fibers having a length of greater than 5 mm and 1.0% by mass to 10% by mass of carbon fibers having a length of less than 2 mm.

In the carbon fiber-reinforced polypropylene sheet of the present invention, it is preferred that, in the frequency distribution of the two-dimensional orientation angles of the above-described carbon fibers, the 30°-interval relative frequency, which is defined in the specification, have a maximum value of 0.25 or smaller and a minimum value of 0.090 or larger.

It is preferred that the carbon fiber-reinforced polypropylene sheet of the present invention have a carbon fiber volume content of 10 to 40%.

It is preferred that the molded article of the present invention have a void ratio, which is defined in the specification, of not higher than 3%.

Effects of the Invention

The carbon fiber-reinforced polypropylene sheet of the present invention has a conventionally unknown characteristic feature in that, by controlling the length of the carbon fibers and the interfacial adhesion between the carbon fibers and polypropylene in specific ranges, the energy absorption associated with withdrawal of the fibers is increased and this allows the carbon fiber-reinforced polypropylene sheet to show exceptional impact resistance along with high mechanical properties. A molded article obtained by using this carbon fiber-reinforced polypropylene sheet can be suitably used as a housing of an electric or electronic equipment or as a shock-absorbing member of an automobile.

MODE FOR CARRYING OUT THE INVENTION

The carbon fiber-reinforced polypropylene sheet of the present invention is one which comprises carbon fibers having a weight-average fiber length of 1.5 mm to 20 mm and a matrix resin composed of a polypropylene and an acid-modified polypropylene, wherein the carbon fibers are dispersed in the form of single fibers and the interfacial shear strength (IFSS) between the carbon fibers and the matrix resin is 5.50 to 10.5 MPa. By satisfying these conditions, a carbon fiber-reinforced propylene sheet for a molded article that is excellent in both mechanical properties and impact resistance was created.

In CFRPs that are reinforced with discontinuous fibers, a technology in which the mechanical properties and impact resistance are improved by improving the adhesion between the carbon fibers and the matrix resin has been commonly employed (Patent Documents 3, 4 and 5, Non-patent Document 1).

However, the present inventors revealed that, in discontinuous fibers having a certain length, by imparting thereto interfacial adhesion in a specific range, the energy absorption associated with withdrawal of the fibers is increased and this allows exceptional impact resistance performance to be exhibited along with high mechanical properties. On the other hand, when the fibers are excessively long, not only the shapability into a complex form is deteriorated, but also the mechanical properties are impaired due to bending and tangling of the fibers. The present invention was arrived as a result of discovering that a carbon fiber-reinforced polypropylene sheet having specific fiber length and interfacial shear strength attains both satisfactory mechanical properties and impact resistance while retaining high shapability.

Here, the term "mechanical properties" used in the present invention refers to the physical property values of a material that are obtained by static mechanical tests, such as elastic modulus, strength and breaking strain, and these properties are distinguished from the impact resistance determined by a dynamic mechanical test.

The carbon fiber-reinforced polypropylene sheet of the present invention and a molded article thereof will now be described in more detail.

In the carbon fiber-reinforced polypropylene sheet of the present invention, the weight-average fiber length is required to be 1.5 mm to 20 mm. Here, the term "weight-average fiber length" represents the weight-average length of fibers, taking the mass of the carbon fibers as 100%. Accordingly, the average length of the carbon fibers contained in the carbon fiber-reinforced polypropylene sheet can be represented by the weight-average fiber length. The weight-average fiber length ($L_w$) is represented by the following equation.

$$L_w = \Sigma(L_i \times W_i)$$

$L_i$: Measured fiber length (i=1, 2, 3, . . . 400) (unit: mm)
$W_i$: Mass fraction of carbon fibers having the fiber length $L_i$ (i=1, 2, 3, . . . 400) (unit: % by mass)

When the weight-average length of the carbon fibers is less than 1.5 mm, since the reinforcing effect of the carbon fibers is low, sufficient mechanical properties cannot be attained. In addition, since the interfacial area between the carbon fibers and the matrix resin is small, the impact resistance is reduced. Meanwhile, when the weight-average fiber length is greater than 20 mm, the thickness expansion in the lamination step or the molding step is increased, so that the ease of handling is impaired. In addition, since the carbon fibers are in the form of bundles due to low dispersibility, the resulting molded article contains voids. Moreover, bending, tangling and the like of the fibers may cause deterioration in the mechanical properties and impact resistance of the resulting molded article.

Further, it is preferred that, the carbon fibers contained in the carbon fiber-reinforced polypropylene sheet of the present invention comprise 20% by mass to 75% by mass of carbon fibers having a length of greater than 5 mm and 1.0% by mass to 25% by mass of carbon fibers having a length of less than 2 mm. By incorporating 20% by mass or more of carbon fibers having a length of greater than 5 mm, a sheet having an excellent balance of mechanical properties and impact resistance can be obtained. Further, when the amount of carbon fibers having a length of greater than 5 mm is 75% by mass or less, since expansion in the thickness direction is inhibited, improvement in the productivity and void reduction can be achieved. By incorporating 1.0% by mass or more of carbon fibers having a length of less than 2 mm, the fluidity at the time of molding is improved. Further, when the amount of carbon fibers having a length of less than 2 mm is 25% by mass or less, an excellent balance of mechanical properties and impact resistance is attained. Here, a carbon fiber mass ratio represents the ratio of a weight-average fiber length, taking the mass of the carbon fibers as 100%.

It is also preferred that, the carbon fibers contained in the carbon fiber-reinforced polypropylene sheet of the present invention comprise 50% by mass to 70% by mass of carbon fibers having a length of greater than 5 mm and 1.0% by mass to 10% by mass of carbon fibers having a length of less than 2 mm. By controlling the fiber length distribution in this range, superior mechanical properties and impact resistance are attained.

Examples of a method of measuring the lengths of carbon fibers include, but not particularly limited to, a method in which the surface of a carbon fiber-reinforced polypropylene sheet is observed under a microscope to measure the lengths of the carbon fibers; and a method in which the matrix resin of a carbon fiber-reinforced polypropylene sheet is dissolved using a solvent which dissolves only the matrix resin and remaining carbon fibers are separated by filtration and measured under a microscope (dissolution method). In cases where no solvent dissolving the matrix resin is available, for example, a method in which only the matrix resin is burned off in a temperature range where the carbon fibers are not reduced in weight by oxidation and the carbon fibers are thereby isolated and measured under a microscope (burn-off method) can be employed. The measurement can be done by randomly selecting 400 carbon fibers, measuring their lengths down to the order of micrometers under a light microscope, and then determining the ratio of the respective measured lengths.

Further, in cases where the carbon fibers used in the present invention are cut in advance, the cutting length is appropriately selected with consideration of the weight-average fiber length of the resulting carbon fiber-reinforced polypropylene sheet. Examples of a cutting method include a method using a cartridge cutter and a method using a guillotine cutter; however, the cutting method is not particularly restricted and it is appropriately selected with consideration of the dimensional accuracy, workability, productivity and the like.

In the carbon fiber-reinforced polypropylene sheet of the present invention, it is important that the carbon fibers be dispersed in the form of single fibers. A case where the carbon fibers are dispersed in the form of single fibers refers to a condition in which a plurality of adjacent single carbon fibers are neither parallel to each other in the lengthwise direction nor in contact with each other. When a plurality of adjacent single carbon fibers are parallel and in contact with each other, the single carbon fibers are said to be in the form of bundles. When a large number of bundle-form carbon fibers are present, since the interfacial area between the carbon fibers and the matrix resin is reduced, the mechanical properties and impact resistance are impaired. In addition, the impregnation efficiency of the matrix resin is reduced, so that voids are generated and the mechanical properties are impaired.

The dispersion state of the carbon fibers is practically evaluated by the degree of fiber dispersion. The term "degree of fiber dispersion" means the number ratio of single carbon fibers (b) having a two-dimensional contact angle of 1° or larger, which two-dimensional contact angle is formed by a single carbon fiber (a) and the single carbon fiber (b) in contact with the single carbon fiber (a) and measured on the side of an acute angle of 0° to 90°.

In the present invention, a condition where the carbon fibers are dispersed in the form of single fibers is represented by a degree of fiber dispersion of 90% or higher. When the carbon fibers are not dispersed in the form of single fibers, that is, when the degree of carbon fiber dispersion is less than 90%, since a large number of bundle-form carbon fibers are present, the interfacial area between the carbon fibers and the matrix resin is reduced and this leads to deterioration of the mechanical properties and the impact resistance. In addition, the impregnation efficiency of the matrix resin is reduced, so that voids are generated and the mechanical properties are impaired. In a more preferred dispersion state of the carbon fibers, the degree of fiber dispersion is 96% or higher.

Here, the two-dimensional contact angles of carbon fibers used to determine the degree of fiber dispersion are calculated by the following method. After randomly selecting 100 single carbon fibers (a), the two-dimensional contact angle is measured for all of single carbon fibers (b) that are in contact with the single carbon fibers (a). The contact angle is measured on the side of an acute angle of 0° to 90° and, from the total number of the single carbon fibers (b) for which the two-dimensional contact angle was measured, the ratio of the single carbon fibers (b) having a contact angle of smaller than 1° is calculated.

Further, although there is no particular restriction on the part where the two-dimensional contact angles of carbon fibers are measured, the measurement is performed near the center of a molded article as far as possible avoiding the edge portion, preferably using the boss, rib and parts where the thickness of the molded article does not change.

Examples of a method of specifically measuring the two-dimensional contact angles of carbon fibers in a carbon fiber-reinforced polypropylene sheet include, but not limited to, a method in which carbon fibers are observed on the surface of a carbon fiber-reinforced polypropylene sheet. In this case, it is preferred to expose the fibers by grinding the surface of the carbon fiber-reinforced polypropylene sheet because this makes it easier to observe the carbon fibers. Another example is a method in which light transmitting through the carbon fiber-reinforced polypropylene sheet is used to observe the orientation of carbon fibers. In this case, it is preferred to thinly slice the carbon fiber-reinforced polypropylene sheet because this makes it easier to observe the carbon fibers. Yet another example is a method in which the carbon fiber-reinforced polypropylene sheet is observed with X-ray CT transmission and an image of the orientation of the carbon fibers is taken. In cases where the carbon fibers have high radiolucency, it is preferred to mix the carbon fibers with tracer fibers or coat the carbon fibers with a tracer agent in advance, because such a treatment makes it easier to observe the carbon fibers.

The method of dispersing the carbon fibers in the form of single fibers is not particularly restricted and examples thereof include a method of obtaining a nonwoven fabric-form carbon fiber base material by a dry or wet papermaking method, a dry spray method or the like. Further, in this carbon fiber base material, organic fibers, an organic compound or an inorganic compound may be admixed or the carbon fibers may be sealed with other component or adhered with a matrix resin component.

For improvement of the carbon fiber dispersion, as dry methods, a method of providing a fiber-opening bar, a method of vibrating a fiber-opening bar, a method of refining the openings of a card and a method of adjusting the card rotational speed can be exemplified. Further, as wet methods, a method of increasing the rotation speed of a stirring apparatus at the time of dispersing carbon fibers, a method of reducing the amount of carbon fibers loaded at a time and a method of inhibiting vortex flow at the time of transferring a dispersion liquid can be exemplified. Moreover, for planarly arranging the carbon fibers, as dry methods, a method in which static electricity is used to accumulate carbon fibers, a method using a regulated air flow and a method of adjusting the conveyor withdrawal rate can be exemplified. As wet methods, a method of preventing reaggregation of dispersed carbon fibers using an ultrasonic wave or the like and a method of adjusting the filtration rate can be exemplified. These methods are not particularly restricted and can be accomplished also by controlling other production conditions while checking the state of the carbon fiber base material.

In the carbon fiber-reinforced polypropylene sheet of the present invention, from the standpoint of the isotropy of the mechanical properties, it is preferred that the 30°-interval relative frequency in the frequency distribution of the two-dimensional orientation angles of the carbon fibers have a maximum value of 0.25 or smaller and a minimum value of 0.090 or larger. The 30°-interval relative frequency in the frequency distribution of the two-dimensional orientation angles of the carbon fibers is an index which indicates the distribution of the two-dimensional orientation angles of carbon fibers on the surface of a molded article.

In the present invention, the maximum and minimum values of the 30°-interval relative frequency in the frequency distribution of the two-dimensional orientation angles of the carbon fibers are determined by the following method. First, 400 carbon fibers are randomly selected and a reference straight line is arbitrarily set as an angular reference. Then, all of the angles formed by the orientation direction of each selected carbon fiber with respect to the reference straight line (hereinafter, simply referred to as "two-dimensional orientation angles $\alpha_i$") are measured. The two-dimensional orientation angle $\alpha_i$ is defined as an angle of 0° to smaller than 180°, which was measured in the counter-clockwise direction with respect to the reference straight line. Using the values of the two-dimensional orientation angles $\alpha_i$ of 400 carbon fibers with respect to a reference line, a 30°-interval relative frequency distribution of the two-dimensional orientation angles of the carbon fibers was prepared, and the maximum and the minimum values thereof were defined as the maximum and minimum values of the 30°-interval relative frequency in the frequency distribution of the two-dimensional orientation angles of the carbon fibers, respectively.

As long as the number of the carbon fibers to be randomly selected is 400 or more, there is substantially no change in the maximum and minimum values of the 30°-interval relative frequency in the frequency distribution of the two-dimensional orientation angles of the carbon fibers. Further, although there is no particular restriction on the part where the maximum and minimum values of the 30°-interval relative frequency in the frequency distribution of the two-dimensional orientation angles of the carbon fibers are measured, the measurement is performed near the center of a molded article as far as possible avoiding the edge portion, preferably using the boss, rib and parts where the thickness of the molded article does not change. A condition where the maximum and minimum values of the 30°-interval relative frequency in the frequency distribution of the two-dimensional orientation angles of the carbon fibers are both 0.17 means that the carbon fibers of the carbon fiber-reinforced polypropylene sheet are completely randomly oriented.

Examples of a method of specifically measuring the two-dimensional orientation angles in a carbon fiber-reinforced polypropylene sheet include a method in which the orientation of carbon fibers are observed on the surface of a carbon fiber-reinforced polypropylene sheet. In this case, it is preferred to expose the fibers by grinding the surface of the carbon fiber-reinforced polypropylene sheet because this makes it easier to observe the carbon fibers. Another example is a method in which light transmitting through a carbon fiber-reinforced polypropylene sheet is used to observe the orientation of carbon fibers. In this case, it is preferred to thinly slice the carbon fiber-reinforced polypropylene sheet because this makes it easier to observe the carbon fibers. Yet another example is a method in which a carbon fiber-reinforced polypropylene sheet is observed with X-ray CT transmission and an image of the orientation of carbon fibers is taken. In cases where the carbon fibers have high radiolucency, it is preferred to mix the carbon fibers with tracer fibers in advance or to coat the carbon fibers with a tracer agent in advance, because such a process makes it easier to observe the carbon fibers.

Further, for a case where it is difficult to perform the measurement by the above-described method, a method in which the orientation of carbon fibers are observed after removing the matrix resin in such a manner that the structure of the carbon fibers is not destroyed can be exemplified. For instance, the measurement can be performed by sandwiching the carbon fiber-reinforced polypropylene sheet with two stainless-steel meshes, fixing the carbon fiber-reinforced polypropylene sheet with screws or the like to prevent the movement thereof, burning off the matrix resin component, and then observing the resulting carbon fiber base material under a light microscope or an electron microscope.

The carbon fibers used in the present invention can be produced using a polyacrylonitrile (hereinafter, referred to as "PAN")-based fiber, pitch fiber, rayon or the like as raw material and, in particular, a so-called PAN-based carbon fiber, which is produced from a PAN-based fiber comprising acrylonitrile as a main component, has excellent industrial productivity as well as excellent mechanical properties. A PAN-based fiber is usually copolymerized with a monomer component that promotes flame-proofing reaction and examples of such a monomer component include itaconic acid, acrylic acid and methacrylic acid as well as methyl esters, ethyl esters, propyl esters, alkali metal salts and ammonium salts of these acids; and allylsulfonic acid, methallylsulfonic acid and styrene sulfonic acid as well as alkali metal salts of these acids. As a spinning method, wet spinning or semi-wet spinning is preferably applied.

Such a PAN-based carbon fiber can be obtained through the flameproofing step of converting a PAN-based fiber produced by polymerization using acrylonitrile as a main component into an oxidized fiber by heating it in a 200 to 400° C. atmosphere; and the carbonization step of carbonizing the oxidized fiber by heating it at a higher temperature in an inert atmosphere of nitrogen, helium, argon or the like (hereinafter, the flameproofing and carbonization steps may be collectively referred to as "the burning step"). In the present invention, the carbonization temperature is preferably 1,200 to 2,200° C.

Further, at least one sizing agent selected from the group consisting of urethane-based resins, acrylic resins, epoxy-based resins, polyamide-based resins and surfactants may be adhered to the carbon fibers used in the present invention. By adhering a sizing agent(s) to the carbon fibers in this manner, the resulting carbon fiber bundle has excellent ease of handling and, in particular, fraying of the fibers at the time of cutting the bundle can be inhibited.

The addition of a sizing agent to the carbon fibers can be performed by immersing the carbon fibers into a so-called sizing solution, which is a solution in which the sizing agent is dissolved in a solvent or a dispersion liquid in which the sizing agent is dispersed in a dispersion medium, and subsequently drying the resulting carbon fibers. In order to prevent variations in the amount of the adhered sizing agent among single carbon fibers, it is preferred to immerse the widened toe of the bundle-form carbon fiber into a sizing solution.

The amount of the sizing agent to be adhered to the carbon fibers is preferably 0.1 to 5% by mass, more preferably 0.5 to 3% by mass, with respect to the amount of the carbon fibers. By controlling the amount of the sizing agent in this range, a carbon fiber bundle having an excellent balance of the processability in cutting and the draping property.

Further, within a range where the effects of the present invention are not adversely affected, the above-described carbon fibers may also be used in combination with a metal fiber such as an aluminum, brass or stainless-steel fiber; a glass fiber; an inorganic fiber composed of silicon carbide, silicon nitride or the like; and/or an organic fiber composed of aramid, PBO, polyphenylene sulfide, polyester, acryl, nylon, polyethylene or the like.

In the carbon fiber-reinforced polypropylene sheet of the present invention, the adhesiveness between the carbon fibers and the matrix resin is represented by the interfacial shear strength (hereinafter, referred to as "IFSS") and, when the adhesiveness is high, the IFSS shows a high value. In order to attain satisfactory mechanical properties and impact resistance, it is important that the IFSS be 5.50 MPa to 10.5 MPa. When the IFSS is less than 5.50 MPa, the mechanical properties are insufficient. Meanwhile, when the IFSS exceeds 10.5 MPa, the carbon fiber-reinforced polypropylene sheet shows a brittle fracture behavior and has insufficient impact resistance.

The details of the evaluation of IFSS will now be described. Upon performing the evaluation, reference was made to Non-patent Document 2. First, a single fiber of 20 cm in length is removed from a carbon fiber bundle. Then, two 150 μm-thick polypropylene films are prepared at a size of 20 cm×20 cm and the removed single fiber is linearly arranged on one of the polypropylene films. The other polypropylene film is laminated thereon in such a manner that the above-described single fiber is sandwiched and the resultant is pressed at 200° C. for 3 minutes under a pressure of 0.5 MPa to prepare a sample in which the single fiber is embedded in polypropylene. The thus obtained sample is then cut out to obtain a test piece of 0.2 mm in thickness, 10 mm in width and 70 mm in length, in which the single fiber is embedded in the center. A total of 10 test pieces are prepared in the same manner as described above.

Using an ordinary tensile test fixture, the thus obtained test pieces are subjected to a tensile test at a strain rate of 0.5 mm/min with the test length being set at 25 mm. When breakage of the single fiber no longer occurs, the lengths of all of the fragments of the single fiber are measured under a transmission microscope and the average thereof is calculated to determine the average breaking fiber length (l). The IFSS (τ) is calculated using the following equations.

$$\tau = (\sigma_f \cdot d)/(2 \cdot l_c)$$

$$l_c = (4/3) \cdot l$$

τ: IFSS (interfacial shear strength) (unit: MPa)
l: Average breaking fiber length described above (unit: μm)
$\sigma_f$: Tensile strength of single fiber (unit: MPa)
d: Diameter of single carbon fiber (unit: μm)

The $\sigma_f$ is determined by the following method, assuming that the tensile strength distribution of the carbon fibers conforms to the Weibull distribution. That is, the single fiber alone is subjected to a tensile test without being embedded into polypropylene and, from the values of the average tensile strength obtained at sample lengths of 5 mm, 25 mm and 50 mm, the relationship between the sample length and the average tensile strength is determined by a least-squares method to calculate the average tensile strength at a sample length of $l_c$.

The matrix resin used in the carbon fiber-reinforced polypropylene sheet of the present invention comprises a polypropylene and an acid-modified polypropylene. The polypropylene is not particularly restricted as long as it is a so-called unmodified polypropylene, and not only a homo-type polypropylene but also a block-type polypropylene in which polypropylene is block-copolymerized with polyethylene or other polyolefin may be used in the present invention.

In the carbon fiber-reinforced polypropylene sheet of the present invention, from the standpoint of the interfacial adhesion, it is preferred that the acid-modified polypropylene content in the matrix resin be 0.1% by mass to 5% by mass. When the acid-modified polypropylene content is 0.1% by mass or higher, excellent mechanical properties are attained. Further, when the acid-modified polypropylene content is 5% by mass or less, the carbon fiber-reinforced polypropylene sheet does not show a brittle fracture behavior and has excellent impact resistance.

The acid-modified polypropylene is not particularly restricted and examples thereof include acrylic acid-modified polypropylenes and maleic anhydride-modified polypropylenes.

Examples of commercially available product of acid-modified polypropylene include POLYBOND 1001 and POLYBOND 1002 (manufactured by Crompton Corp.), which are acrylic acid-modified polypropylenes; and QE510 (manufactured by Mitsui Chemicals, Inc.), which is a maleic anhydride-modified polypropylene.

The carbon fiber-reinforced polypropylene sheet of the present invention has a fiber volume content ($V_f$) of preferably 10 to 40%, more preferably 20 to 30%. By controlling the fiber volume content in this range, a sheet which contains only a small amount of voids and has an excellent balance of mechanical properties and impact resistance can be obtained. In addition, when the fiber volume content is in this range, excellent fiber-strength utilization and excellent weight-reducing effect for the cost are attained.

In the carbon fiber-reinforced polypropylene sheet of the present invention, depending on the intended use thereof, for example, a filler such as mica, talc, kaolin, sericite, bentonite, xonotlite, sepiolite, smectite, montmorillonite, wollastonite, silica, calcium carbonate, glass beads, glass flake, glass microballoon, clay, molybdenum disulfide, titanium oxide, zinc oxide, antimony oxide, calcium polyphosphate, graphite, barium sulfate, magnesium sulfate, zinc borate, calcium borate, aluminum borate whisker, potassium titanate whisker or a macromolecular compound; a conductivity-imparting agent, such as a metallic or metal oxide-based conductivity-imparting agent, carbon black or graphite powder; a halogen-based flame retardant such as a brominated resin; an antimony-based flame retardant such as antimony trioxide or antimony pentoxide; a phosphorus-based flame retardant such as ammonium polyphosphate, aromatic phosphate or red phosphorus; an organic acid metal salt-based flame retardant such as a metal organoborate, a metal carboxylate or a metal salt of aromatic sulfonimide; an inorganic flame retardant such as zinc borate, zinc, zinc oxide or a zirconium compound; a nitrogen-based flame retardant such as cyanuric acid, isocyanuric acid, melamine, melamine cyanurate, melamine phosphate or guanidine nitride; a fluorine-based flame retardant such as PTFE; a silicone-based flame retardant such as polyorganosiloxane; a metal hydroxide-based flame retardant such as aluminum hydroxide or magnesium hydroxide; other flame retardant; a flame-retardant aid such as cadmium oxide, zinc oxide, cuprous oxide, cupric oxide, ferrous oxide, ferric oxide, cobalt oxide, manganese oxide, molybdenum oxide, tin oxide or titanium oxide; a pigment; a dye; a lubricant; a mold-releasing agent; a compatibilizing agent; a dispersant; a nucleating agent such as mica, talc, or kaolin; a plasticizer such as phosphoric acid ester; a heat stabilizer; an antioxidant; a color inhibitor; an ultraviolet absorber; a fluidity modifier; a foaming agent; an antibacterial agent; a vibration-reducing agent; a deodorizer; a slide modifier; and/or an antistatic agent such as polyether ester amide may be incorporated as well.

A molded article is obtained by molding the carbon fiber-reinforced polypropylene sheet of the present invention.

From the standpoint of the mechanical properties, the molded article of the present invention preferably has a void ratio of 3% or less. The void ratio of a molded article is measured by the following method. A portion of the molded article is cut out and the density ($\rho_c$) thereof is measured in accordance with the method A (underwater substitution method) prescribed in the section 5 of JIS K7112 (1999). From the thus obtained density ($\rho_c$) of the molded article and the density ($\rho_r$) of the matrix resin, the void ratio ($V_v$) of the molded article is determined using the following equation.

$$V_v=(1-\rho_c/\rho_r)\times100 \text{ (unit: \% by volume)}$$

Although there is no particular restriction on the part of a molded article where the void ratio ($V_v$) is measured, the measurement is performed near the center of the molded article as far as possible avoiding the edge portion, preferably using the boss, rib and parts where the thickness of the molded article does not change.

The molding method is not particularly restricted; however, press molding is preferred. Further, the type of press molding can be selected in accordance with the molded article to be obtained. Here, "press molding" is a method of obtaining a molded article by subjecting a laminate of carbon fiber-reinforced polypropylene sheets to deformation such as bending, shearing and compression with the use of a processing machine, mold, tool, other fixture for molding, subsidiary material and the like, and examples of the mode of press molding include deep drawing, flanging, corrugating, edge curling and die forging. Further, among a variety of existing press molding method, for example, an autoclave method which is often used for producing a molded component of a large airplane and a die-pressing method which has relatively simple steps are preferred as a press molding method. From the standpoints of the facility, the amount of energy to be used in the molding step, the simplification of the molding fixtures, subsidiary materials and the like to be used and the degree of freedom in terms of the molding pressure and temperature, it is more preferred to employ a die-pressing method in which molding is performed using a metal die.

As a die-pressing method, a hot-press method in which a carbon fiber-reinforced polypropylene sheet is arranged in a die in advance and a molded article is obtained by applying thereto pressure and heat together with clamping of the die and subsequently cooling the carbon fiber-reinforced polypropylene sheet by cooling the die while continuing to clamp the die; or stamping molding in which a carbon fiber-reinforced polypropylene sheet is heated in advance to a temperature equal to or higher than the melting point of its matrix resin using a heating device such as a far-infrared heater, a hot plate, a high-temperature oven or a dielectric heater and, with the matrix resin being in a molten or softened state, the carbon fiber-reinforced polypropylene sheet is arranged on a die that is to be a lower surface of the molding die and the die is then closed for clamping, followed by pressing and cooling, can be employed. The press molding method is not particularly restricted; however, from the standpoint of accelerating the molding cycle to increase the productivity, stamping molding is preferred.

The pressure applied in the pressing die is not particularly restricted; however, from the standpoint of attaining good shaping of the carbon fiber-reinforced polypropylene sheet, the applied pressure is preferably 1 MPa or higher, more preferably 3 MPa or higher. The upper limit of the applied pressure is not particularly restricted; however, from the standpoint of inhibiting breakage of the carbon fibers during molding, it is preferably in the range of 100 MPa or less.

From the standpoint of sufficiently cooling the preheated laminate of carbon fiber-reinforced polypropylene sheets, it is preferred to control the die surface temperature to be not higher than the melting point or softening point of the matrix resin. From the standpoint of facilitating the release from the die to shorten the molding cycle, it is preferred to control the die temperature to be lower than the melting point or softening point of the matrix resin by not less than 30° C., more preferably not less than 50° C.

Examples of the application of the molded article of the present invention include: members of electric and electronic instruments, such as housings, trays, chassis, interior members and casings of personal computers, displays, OA equipments, cellular phones, portable information terminals, fax machines, compact disks, portable MDs, portable cassette radio players, PDAs (portable digital assistants such as electronic organizers), video camcorders, digital camcorders, optical instruments, audio devices, air conditioners, lighting equipments, recreational goods, toys and other home electric appliances; civil engineering and construction parts such as columns, panels and reinforcing materials; components of suspensions, accelerators and steering wheels, such as various members, frames, hinges, arms, axle shafts, wheel bearings, beams, propeller shafts, wheels and gearboxes; components of outer plates and body parts, such as hoods, roofs, doors, fenders, trunk lids, side panels, rear-end panels, upper-back panels, front bodies and under bodies as well as various pillars, members, frames, beams, supports, rails and hinges; exterior parts such as bumpers, bumper beams, moldings, under-covers, engine covers, current plates, spoilers, cowl louvers and aero parts; interior parts such as instrument panels, sheet frames, door trims, pillar trims, steering wheels and various modules; structural parts of automobiles and two-wheel vehicles such as components of fuel, exhaust and intake systems, including motor components, CNG tanks, gasoline tanks, fuel pumps, air-intakes, intake manifolds, carburetor main bodies and carburetor spacers as well as various pipings and bulbs; other components of automobiles and two-wheel vehicles such as alternator terminals, alternator connectors, IC regulators, potentiometer bases for light dimmers, engine coolant joints, air-conditioning thermostat bases, heater air flow control bulbs, brush holders for radiator motors, turbine vanes, wiper motor-related components, distributors, starter switches, starter relays, windshield washer fluid nozzles, air conditioner panel switch boards, fuel solenoid valve coils, battery trays, AT brackets, head lamp supports, pedal housings, protectors, horn terminals, step motor rotors, lamp sockets, lamp reflectors, lamp housings, brake pistons, noise shields, spare tire covers, solenoid bobbins, engine oil filters, ignition system casings, scuff plates and fascias; and aircraft components such as landing gear pods, winglets, spoilers, edges, ladders, elevators, fairings and ribs. From the standpoint of the mechanical properties, the molded article of the present invention can be preferably used in the housings of electric and electronic instruments, panels for civil engineering and construction, structural parts of automobiles, and aircraft components. From the standpoint of the mechanical properties and impact resistance, the molded article of the present invention can be particularly preferably used in the structural parts of automobiles and two-wheel vehicles.

EXAMPLES

Carbon Fiber (A)

A-1: PAN-Based Carbon Fiber

A carbon fiber bundle A-1 was produced as follows.

Using a copolymer composed of 99.4 mol % of acrylonitrile (AN) and 0.6 mol % of methacrylic acid, an acrylic fiber bundle having a single fiber fineness of 1.1 dtex and 24,000 filaments was obtained by a dry-wet spinning method. The thus obtained PAN-based fiber bundle was heated in the air having a temperature of 240 to 280° C. at a draw ratio of 1.05 to be converted into flameproof fibers. Then, after subjecting the flameproof fibers to 10%-stretching at a heating rate of 200° C./min under a nitrogen atmosphere in the temperature range of 300 to 900° C., the resulting fibers were heated to 1,300° C. to be baked, thereby obtaining a carbon fiber bundle. In an aqueous solution containing sulfuric acid as electrolyte, the thus obtained carbon fiber bundle was subjected to an electrolytic surface treatment at 3 coulombs per gram of carbon fibers. Further, a sizing agent was added by an immersion method and the resulting carbon fiber bundle was dried in heated air of 120° C. to obtain a PAN-based carbon fiber bundle. The physical properties of the thus obtained carbon fiber bundle A-1 are shown below.

Total number of filaments: 24,000
Single fiber diameter: 7 μm
Mass per unit length: 0.8 g/m
Specific gravity: 1.8 g/cm$^3$
Tensile strength: 4.2 GPa
Tensile elastic modulus: 230 GPa
O/C: 0.10
Type of sizing agent: polyoxyethylene oleyl ether
Amount of added sizing agent: 1.5% by mass

[Resin (B) used in Matrix Resin]
B-1: unmodified polypropylene
"PRIME POLYPRO" (registered trademark) J106MG, manufactured by Prime Polymer Co., Ltd.
B-2: maleic anhydride-modified polypropylene
"ADMER" (registered trademark) QE800, manufactured by Mitsui Chemicals, Inc.
B-3: maleic anhydride-modified polypropylene
"ADMER" (registered trademark) QE510, manufactured by Mitsui Chemicals, Inc. [Binder (C)]
C-1: poly(ethylene glycol)bis(3-aminopropyl)terminated, manufactured by Sigma-Aldrich Japan
Number-average molecular weight: 1,500
Total amine value: 75 mgKOH/g Reference Example 1

The maleic anhydride-modified polypropylene (B-2) and the unmodified polypropylene (B-1) were blended at a ratio of 0.1% by mass and 99.9% by mass, respectively, with respect to a total of 100% by mass, and the resultant was melt-kneaded under the following conditions to obtain a matrix resin. The melt-kneading was performed using a biaxial extruder TEX-30α manufactured by Nihon Seiko Co., Ltd., which was set to have a barrel temperature of 220° C., a screw diameter of 30 mm and a rotation speed of 150 rpm.

Reference Example 2

A prescribed amount of the matrix resin prepared in Reference Example 1 was arranged on a stainless-steel plate and another stainless-steel plate was laminated thereon with a 0.10-mm spacer being inserted between the plates. The resultant was maintained for 5 minutes under a press temperature of 220° C. and a pressure of 1 MPa and processed into the form of a 0.10 mm-thick, 200 mm×200 mm film, thereby obtaining a resin sheet.

Reference Example 3

A matrix resin was obtained by performing kneading in the same manner as in Reference Example 1, except that the maleic anhydride-modified polypropylene (B-2) and the unmodified polypropylene (B-1) were blended at a ratio of 3% by mass and 97% by mass, respectively, with respect to a total of 100% by mass.

Reference Example 4

A resin sheet was obtained in the same manner as in Reference Example 2, except that the matrix resin prepared in Reference Example 3 was used.

Reference Example 5

A matrix resin was obtained by performing kneading in the same manner as in Reference Example 1, except that the maleic anhydride-modified polypropylene (B-2) and the unmodified polypropylene (B-1) were blended at a ratio of 5% by mass and 95% by mass, respectively, with respect to a total of 100% by mass.

Reference Example 6

A resin sheet was obtained in the same manner as in Reference Example 2, except that the matrix resin prepared in Reference Example 5 was used.

Reference Example 7

A resin sheet was obtained in the same manner as in Reference Example 2, except that the unmodified polypropylene (B-1) was used as the matrix resin.

Reference Example 8

A matrix resin was obtained by performing kneading in the same manner as in Reference Example 1, except that the maleic anhydride-modified polypropylene resin (B-2) and the unmodified polypropylene (B-1) were blended at a ratio of 10% by mass and 90% by mass, respectively, with respect to a total of 100% by mass.

Reference Example 9

A resin sheet was obtained in the same manner as in Reference Example 2, except that the matrix resin prepared in Reference Example 8 was used.

Reference Example 10

A resin sheet was obtained in the same manner as in Reference Example 2, except that the maleic anhydride-modified polypropylene (B-3) was used as the matrix resin.

Reference Example 11

A matrix resin was obtained by performing kneading in the same manner as in Reference Example 1, except that the maleic anhydride-modified polypropylene (B-2) and the unmodified polypropylene (B-1) were blended at a ratio of 1% by mass and 99% by mass, respectively, with respect to a total of 100% by mass.

Reference Example 12

A resin sheet was obtained in the same manner as in Reference Example 2, except that the matrix resin prepared in Reference Example 11 was used.

[Evaluation and Measurement Methods]

The evaluation criteria used in Examples below are as follows.

(1) Measurement of Weight-Average Fiber Length ($L_w$) of Carbon Fibers Contained in Carbon Fiber-Reinforced Polypropylene Sheet A portion of the subject molded article was cut out and the matrix resin was sufficiently dissolved in a solvent for dissolving the matrix resin. Then, by a known operation such as filtration, carbon fibers were separated from the matrix resin. In cases where no solvent dissolving the matrix resin was available, a portion of the molded article was cut out and heated for 30 minutes at a temperature of 500° C. to burn off the matrix resin, thereby separating carbon fibers. Thereafter, 400 of the thus separated carbon fibers were randomly extracted and their lengths were measured in the order of micrometers under a light microscope or scanning electron microscope and the measured values were defined as the lengths of the respective fibers. The weight-average fiber length ($L_w$) was determined by the following equation.

$$L_w = \Sigma(L_i \times W_i)$$

$L_i$: Measured fiber length (i=1, 2, 3, ... 400) (unit: mm)
$W_i$: Mass fraction of carbon fibers having the fiber length $L_i$ (i=1, 2, 3, ... 400) (unit: % by mass)

Further, the numbers of carbon fibers having a length of 2 mm or less, 2 mm to less than 5 mm, and 5 mm or greater were counted and multiplied with the respective mass fractions to evaluate the mass distribution of fiber length.

(2) Calculation of Degree of Fiber Dispersion

A portion of the subject carbon fiber-reinforced polypropylene sheet is cut out to obtain a test piece and this test piece is embedded in an epoxy resin. The surface of the carbon fiber-reinforced polypropylene sheet is ground to a depth of 100 μm from the surface to prepare a test piece for observation.

The thus obtained test piece for observation of the carbon fiber-reinforced polypropylene sheet is observed under a light microscope and 100 single carbon fibers (a) are randomly selected. For all of single carbon fibers (b) in contact with the single carbon fibers (a), the two-dimensional contact angle is measured on the side of an acute angle of 0° to 90°. From the total number of single carbon fibers whose two-dimensional contact angle was measured, the ratio of the single carbon fibers having a two-dimensional contact angle of smaller than 1° was calculated.

$$P = n/N \times 100 \text{ (unit: \%)}$$

P: Degree of fiber dispersion
n: Number of single carbon fibers having a contact angle of smaller than 1°
N: Total number of single carbon fibers whose contact angle was measured The degree of fiber dispersion (P) was evaluated based on the following criteria. The evaluations of A and B are satisfactory and the evaluation of C is not satisfactory.

A: The degree of fiber dispersion was 96% or higher.
B: The degree of fiber dispersion was 90% to less than 96%.
C: The degree of fiber dispersion was less than 90%.

(3) Evaluation of IFSS

For the details of the evaluation, reference was made to Non-patent Document 2. From a carbon fiber bundle to which a (meth)acrylic polymer was adhered, a single fiber of 20 cm in length was removed. Then, two resin films obtained in the respective Reference Examples were prepared and the removed single fiber was linearly arranged on one of the resin films. The other resin film was laminated thereon in such a manner that the above-described single fiber was sandwiched and the resultant was pressed at 200° C. for 3 minutes under a pressure of 0.5 MPa to prepare a sample in which the single fiber was embedded in the resin. The thus obtained sample was then cut out to obtain a test piece of 0.2 mm in thickness, 10 mm in width and 70 mm in length, in which the single fiber was embedded in the center. A total of 10 test pieces were prepared in the same manner as described above.

Using an ordinary tensile test fixture, the thus obtained test pieces were subjected to a tensile test at a strain rate of 0.5 mm/min with the test length being set at 25 mm. When breakage of the single fiber no longer occurred, the lengths of all of the fragments of the single fiber were measured under a transmission microscope and the average thereof was calculated to determine the average breaking fiber length (l).

The IFSS ($\tau$) was calculated using the following equations.

$$\tau = (\sigma_f \cdot d)/(2 \cdot l_c)$$

$$l_c = (4/3) \cdot l$$

$\tau$: IFSS (interfacial shear strength) (unit: MPa)
l: Average breaking fiber length described above (unit: μm)
$\sigma_f$: Tensile strength of single fiber (unit: MPa)
d: Diameter of single carbon fiber (unit: μm)

The $\sigma_f$ was determined by the following method, assuming that the tensile strength distribution of the carbon fibers conforms to the Weibull distribution. That is, using the single fiber prior to the adhesion of (meth)acrylic polymer, the tensile strength thereof at each sample length of 5 mm, 25 mm and 50 mm was determined in accordance with JIS R7606. Specifically, the subject carbon fiber bundle was divided substantially equally into four bundles and 100 single fibers were sampled sequentially from the four bundles. Here, the sampling was performed evenly from the entirety of each bundle as much as possible. The thus sampled single fibers were fixed onto a perforated board with an adhesive. The board on which the single fibers were fixed was then mounted on a tensile tester and a tensile test was carried out at a strain rate of 1 mm/min with a sample size of 100. From the thus obtained value of the average tensile strength, the relationship between the sample length and the average tensile strength was determined by a least-squares method to calculate the average tensile strength at a sample length of $l_c$.

(4) Method of Evaluating Distribution of Orientation Angles

A portion of the subject carbon fiber-reinforced polypropylene sheet is cut out to obtain a test piece and this test piece is embedded in an epoxy resin. The surface of the carbon fiber-reinforced polypropylene sheet is ground to a depth of 100 μm from the surface to prepare a test piece for observation.

The thus obtained test piece for observation of the carbon fiber-reinforced polypropylene sheet is observed under a light microscope and 400 single carbon fibers are randomly selected. Then, a reference straight line is arbitrarily set as an angular reference and all of the angles formed by the orientation direction of each selected carbon fiber with respect to the reference straight line (hereinafter, simply referred to as "orientation angles $\alpha_i$") are measured. The orientation angle $\alpha_i$ is defined as an angle of 0° to smaller than 180°, which was measured in the counter-clockwise direction with respect to the reference straight line. The 30°-interval relative frequency of this orientation angle $\alpha_i$ is determined by the following equations.

$\alpha_i$: Measured orientation angle (i=1, 2, . . . , 400)

N0-30: Number of carbon fibers of 0≤orientation angle $\alpha_i$<30 (i=1, 2, . . . , 400)

N30-60: Number of carbon fibers of 30≤orientation angle $\alpha_i$<60 (i=1, 2, . . . , 400)

N60-90: Number of carbon fibers of 60≤orientation angle $\alpha_i$<90 (i=1, 2, . . . , 400)

N90-120: Number of carbon fibers of 90≤orientation angle $\alpha_i$<120 (i=1, 2, . . . , 400)

N120-150: Number of carbon fibers of 120≤orientation angle $\alpha_i$<150 (i=1, 2, . . . , 400)

N150-180: Number of carbon fibers of 150≤orientation angle $\alpha_i$<180 (i=1, 2, . . . , 400)

Maximum value of relative frequency=MAX (N0-30, N30-60, N60-90, N90-120, N120-150, N150-180)/400

Minimum value of relative frequency=MIN (N0-30, N30-60, N60-90, N90-120, N120-150, N150-180)/400

Further, as a test piece for measuring the orientation angle distribution of a carbon fiber-reinforced polypropylene sheet, the edge portion of the carbon fiber-reinforced polypropylene sheet or its molded article was avoided, and the measurement was performed near the center as much as possible using the boss, rib and parts where the thickness of the molded article does not change.

As an index of random orientation of fibers, the maximum value of the relative frequency in the orientation angle distribution of the subject carbon fiber-reinforced polypropylene sheet or its molded article was measured and evaluated based on the following criteria. The evaluation of A is the most favorable, followed by the evaluations of B and C in the order mentioned.

A: The maximum value of the relative frequency was 0.17 to less than 0.22.

B: The maximum value of the relative frequency was 0.22 to less than 0.25.

C: The maximum value of the relative frequency was 0.25 or larger.

Further, as another index of random orientation of fibers, the minimum value of the relative frequency in the orientation angle distribution of the subject carbon fiber-reinforced polypropylene sheet or its molded article was measured and evaluated based on the following criteria. The evaluation of A is the most favorable, followed by the evaluations of B and C in the order mentioned.

A: The minimum value of the relative frequency was 0.12 to 0.17.

B: The minimum value of the relative frequency was 0.090 to less than 0.12.

C: The minimum value of the relative frequency was less than 0.090.

(5) Method of Measuring Carbon Fiber Mass Content

A 1 cm×1 cm test piece is cut out from a molded article and loaded to a quartz glass container. This container is vacuum-dried for 24 hours at a temperature of 60° C. and, after allowing the container to cool to room temperature in a desiccator, the total mass of the test piece and the quartz glass container, $W_1$ (g), and the mass of the quartz glass container, $W_0$ (g), are weighed. With the test piece being left in the container, the matrix resin is burned off by heating the container in the air at a temperature of 500° C. for 30 minutes. Then, the container is cooled to room temperature in a nitrogen atmosphere and the total mass of the carbon fibers and the quartz glass container, $W_2$ (g), is weighed.

After the above-described processes, the carbon fiber mass content ($W_f$) of the molded article is determined using the following equation.

$$W_f = 100 \times (W_2 - W_0)/(W_1 - W_0) \text{ (unit: \% by mass)}$$

The number of measurements was 5 (n=5) and the average value thereof was defined as the carbon fiber mass content ($W_f$).

(6) Method of Measuring Density of Molded Article

The density ($\rho_c$) of a molded article was measured in accordance with the method A (underwater substitution method) prescribed in the section 5 of JIS K7112 (1999). The subject molded article was cut out into a size of 1 cm×1 cm, vacuum-dried for 24 hours at a temperature of 60° C. and then cooled to room temperature in a desiccator, thereby preparing a test piece. As an immersion liquid, ethanol was employed. The number of measurements was 5 (n=5) and the average value thereof was defined as the density ($\rho_c$) of the molded article.

(7) Method of Evaluating Carbon Fiber Volume Content and Void Ratio of Molded Article Using the carbon fiber mass content ($W_f$) of the molded article measured in (4) and the density ($\rho_c$) of the molded article measured in (5), the carbon fiber volume content ($V_f$), the matrix resin volume content ($V_r$) and the void ratio ($V_v$) of the molded article are determined using the following equations.

$$V_f = W_f \times \rho_c / \rho_f \text{ (unit: \% by volume)}$$

$$V_r = (100 - W_f) \times \rho_c / \rho_r \text{ (unit: \% by volume)}$$

$$V_v = 100 - (V_f + V_r) \text{ (unit: \% by volume)}$$

$\rho_c$: Density of molded article (unit: g/m³)
$\rho_f$: Density of carbon fibers (unit: g/m³)
$\rho_r$: Density of matrix resin (unit: g/m³)
$W_f$: Carbon fiber mass content of molded article (unit: % by mass)

The void ratio ($V_v$) of a molded article was evaluated based on the following criteria. The evaluation of A is the most favorable, followed by the evaluations of B and C in the order mentioned.

A: The void ratio was less than 3%.
B: The void ratio was 3% to less than 10%.
C: The void ratio was 10% or higher.

(8) Evaluation of Bending Strength of Molded Article

The bending strength of a molded article was evaluated in accordance with the standard of ASTM D-790.

From each of the molded articles obtained in Examples and Comparative Examples, a bending test piece of 80±1 mm in length and 25±0.2 mm in width was cut out in the four directions of 0°, +45°, −45° and 90°, taking an arbitrary direction as the 0° direction. For each direction, the number of measurements was 5 (n=5) and the average of all of the measured values was defined as the bending strength.

Using "INSTRON" (registered trademark) universal tester Model 4201 (manufactured by Instron Co., Ltd.) as a test apparatus, the support span was set at 51.2 mm with a 3-point bend fixture (indenter diameter: 10 mm, support point diameter: 10 mm) and the bending strength was measured at a crosshead speed of 1.37 mm/min. The respective test pieces were tested under a condition where the test pieces had a moisture content of 0.1% by mass or less, the atmospheric temperature was 23° C. and the humidity was 50% by mass.

The bending strength of each molded article was evaluated based on the criteria described below.

The evaluation criteria were set in accordance with the CF volume content.

The bending strength of a molded article having $V_f$ of 10% was evaluated based on the following criteria where the evaluations of D and worse were regarded as unsatisfactory.
A: The bending strength was 250 MPa or higher.
B: The bending strength was 200 MPa to less than 250 MPa.
C: The bending strength was 150 MPa to less than 200 MPa.
D: The bending strength was 100 MPa to less than 150 MPa.
E: The bending strength was less than 100 MPa.

The bending strength of a molded article having $V_f$ of 20% was evaluated based on the following criteria where the evaluations of D and worse were regarded as unsatisfactory.
A: The bending strength was 300 MPa or higher.
B: The bending strength was 250 MPa to less than 300 MPa.
C: The bending strength was 200 MPa to less than 250 MPa.
D: The bending strength was 150 MPa to less than 200 MPa.
E: The bending strength was less than 150 MPa.

The bending strength of a molded article having $V_f$ of 30% was evaluated based on the following criteria where the evaluations of D and worse were regarded as unsatisfactory.
A: The bending strength was 350 MPa or higher.
B: The bending strength was 300 MPa to less than 350 MPa.
C: The bending strength was 250 MPa to less than 300 MPa.
D: The bending strength was 200 MPa to less than 250 MPa.
E: The bending strength was less than 200 MPa.

The bending strength of a molded article having $V_f$ of 40% was evaluated based on the following criteria where the evaluations of D and worse were regarded as unsatisfactory.
A: The bending strength was 350 MPa or higher.
B: The bending strength was 300 MPa to less than 350 MPa.
C: The bending strength was 250 MPa to less than 300 MPa.
D: The bending strength was 200 MPa to less than 250 MPa.
E: The bending strength was less than 200 MPa.

(9) Evaluation of Coefficient of Variation of Bending Strength

Using the values of the bending strength ($\sigma_b$) and the standard deviation thereof ($s_b$), the coefficient of variation ($CV_b$) of the bending strength is determined using the following equation.

$$CV_b = s_b/\sigma_b \times 100 \text{ (unit: \%)}$$

The coefficient of variation ($CV_b$) of the bending strength was evaluated based on the following criteria. The evaluation of A is the most favorable, followed by the evaluations of B and C in the order mentioned.
A: The coefficient of variation of the bending strength was less than 4%.
B: The coefficient of variation of the bending strength was 4% to less than 10%.
C: The coefficient of variation of the bending strength was 10% or larger.

(10) Evaluation of Izod Impact Strength (Notched) of Molded Article

The Izod impact strength (notched) of a molded article was evaluated in accordance with the ASTM D256 standard.

From each of the molded articles obtained in Examples and Comparative Examples, a test piece for Izod impact strength test, which had a length of 62±1 mm, a width of 12.7±0.15 mm and a notch of 22.5°±0.5° and 0.25±0.05 R was cut out in the four directions of 0°, +45°, −45° and 90°, taking an arbitrary direction as the 0° direction. For each direction, the number of measurements was 5 (n=5) and the average of all of the measured values was defined as the Izod impact strength (notched). The respective test pieces were tested under a condition where the test pieces had a moisture content of 0.1% by mass or less, the atmospheric temperature was 23° C. and the humidity was 50% by mass.

The evaluation criteria were set in accordance with the CF volume content.

The Izod impact strength (notched) of a molded article having $V_f$ of 10% was evaluated based on the following criteria where the evaluations of D and worse were regarded as unsatisfactory.
A: The Izod impact strength (notched) was 400 J/m or higher.
B: The Izod impact strength (notched) was 300 J/m to less than 400 J/m.
C: The Izod impact strength (notched) was 200 J/m to less than 300 J/m.
D: The Izod impact strength (notched) was 100 J/m to less than 200 J/m.
E: The Izod impact strength (notched) was less than 100 J/m.

The Izod impact strength (notched) of a molded article having $V_f$ of 20% was evaluated based on the following criteria where the evaluations of D and worse were regarded as unsatisfactory.
A: The Izod impact strength (notched) was 400 J/m or higher.
B: The Izod impact strength (notched) was 300 J/m to less than 400 J/m.
C: The Izod impact strength (notched) was 200 J/m to less than 300 J/m.
D: The Izod impact strength (notched) was 100 J/m to less than 200 J/m.
E: The Izod impact strength (notched) was less than 100 J/m.

The Izod impact strength (notched) of a molded article having $V_f$ of 30% was evaluated based on the following criteria where the evaluations of D and worse were regarded as unsatisfactory.
A: The Izod impact strength (notched) was 600 J/m or higher.
B: The Izod impact strength (notched) was 500 J/m to less than 600 J/m.
C: The Izod impact strength (notched) was 400 J/m to less than 500 J/m.
D: The Izod impact strength (notched) was 300 J/m to less than 400 J/m.
E: The Izod impact strength (notched) was less than 300 J/m.

The Izod impact strength (notched) of a molded article having $V_f$ of 40% was evaluated based on the following criteria where the evaluations of D and worse were regarded as unsatisfactory.
A: The Izod impact strength (notched) was 600 J/m or higher.
B: The Izod impact strength (notched) was 500 J/m to less than 600 J/m.

C: The Izod impact strength (notched) was 400 J/m to less than 500 J/m.

D: The Izod impact strength (notched) was 300 J/m to less than 400 J/m.

E: The Izod impact strength (notched) was less than 300 J/m.

(11) Evaluation of Coefficient of Variation of Izod Impact Strength

Using the values of the Izod impact strength (E) and the standard deviation thereof ($s_e$), the coefficient of variation ($CV_i$) of the Izod impact strength is determined using the following equation.

$$CV_i = s_e/E \times 100 \text{ (unit: \%)}$$

The coefficient of variation ($CV_i$) of the Izod impact strength was evaluated based on the following criteria. The evaluation of A is the most favorable, followed by the evaluations of B and C in the order mentioned.

A: The coefficient of variation of the Izod impact strength was less than 4%.

B: The coefficient of variation of the Izod impact strength was 4% to less than 10%.

C: The coefficient of variation of the Izod impact strength was 10% or larger.

Example 1

To a cylindrical container having an inner diameter of 300 mm, 8 g of a surfactant (polyethylene glycol lauryl ether, manufactured by Nacalai Tesque, Inc.) was loaded, and tap water was poured into the cylindrical container to a combined volume of 8 L, thereby obtaining a 0.1%-by-mass aqueous surfactant solution. To this aqueous surfactant solution, 6.87 g of carbon fibers (A-1), which were cut at a length of 6 mm using a cartridge cutter, was loaded, and the resulting aqueous solution was stirred for 10 minutes using a uniaxial stirrer. After confirming that the carbon fibers were sufficiently dispersed, a stirring rod equipped with a metal mesh at the tip was moved up and down three times or so in the aqueous solution such that the fibers, which had been concentrically oriented due to the rotation of the stirrer, were randomly oriented. The aqueous solution was then subjected to a dehydration treatment and dried at a temperature of 140° C. for 10 minutes to obtain a sheet article of the carbon fibers. The thus obtained sheet article was in the form of a circle having a diameter of 300 mm and had a basis weight of 100 g/m².

Next, on each of the top and bottom surfaces of the thus obtained sheet article of the carbon fibers, one resin sheet prepared in Reference Example 4 was laminated. The resulting laminate in which the sheet article was sandwiched by a total of two resin sheets was then set on a stainless-steel tool plate and pressed for 5 minutes at a press temperature of 220° C. and a pressure of 5 MPa, thereby obtaining a carbon fiber-reinforced polypropylene sheet. The above-described resin sheet was adjusted to have a carbon fiber volume content of 20%. Also, the thickness of the sheet-form molding material was adjusted to be 0.27 mm using a 0.27-mm spacer.

The thus obtained carbon fiber-reinforced polypropylene sheet was cut into a size of 200 mm×200 mm and this was laminated in 12 layers. The resulting laminate was set on a pressing plate die (200 mm×200 mm) and press-molded for 5 minutes at a press temperature of 220° C. and a pressure of 5 MPa using a press machine. Thereafter, while keeping the laminate pressed by the press machine, the laminate was allowed to naturally cool to a room temperature of 25° C. to obtain a molded article. Here, the thickness of the molded article was adjusted to be 3.2 mm using a 3.2-mm spacer. The thus obtained molded article was cut out into a prescribed size and evaluated.

Example 2

A carbon fiber-reinforced polypropylene sheet and a molded article thereof were obtained and evaluated in the same manner as in Example 1, except that the resin sheet prepared in Reference Example 2 was used in place of the resin sheet prepared in Reference Example 4.

Example 3

A carbon fiber-reinforced polypropylene sheet and a molded article thereof were obtained and evaluated in the same manner as in Example 1, except that the resin sheet prepared in Reference Example 6 was used in place of the resin sheet prepared in Reference Example 4.

Example 4

A carbon fiber-reinforced polypropylene sheet and a molded article thereof were obtained and evaluated in the same manner as in Example 1, except that the carbon fibers (A-1) were cut at a length of 5.5 mm instead of 6 mm.

Example 5

A carbon fiber-reinforced polypropylene sheet and a molded article thereof were obtained and evaluated in the same manner as in Example 1, except that the carbon fibers (A-1) were cut at a length of 5 mm instead of 6 mm.

Example 6

A carbon fiber-reinforced polypropylene sheet and a molded article thereof were obtained and evaluated in the same manner as in Example 1, except that the carbon fibers (A-1) were cut at a length of 2 mm instead of 6 mm.

Example 7

A carbon fiber-reinforced polypropylene sheet and a molded article thereof were obtained and evaluated in the same manner as in Example 1, except that the carbon fibers (A-1) were cut at a length of 20 mm instead of 6 mm.

Example 8

A carbon fiber-reinforced polypropylene sheet and a molded article thereof were obtained and evaluated in the same manner as in Example 1, except that the resin sheet was adjusted to have a carbon fiber volume content of 10%.

Example 9

A carbon fiber-reinforced polypropylene sheet and a molded article thereof were obtained and evaluated in the same manner as in Example 1, except that the resin sheet was adjusted to have a carbon fiber volume content of 30%.

Example 10

A carbon fiber-reinforced polypropylene sheet and a molded article thereof were obtained and evaluated in the same manner as in Example 1, except that the resin sheet was adjusted to have a carbon fiber volume content of 40%.

Example 11

A carbon fiber-reinforced polypropylene sheet and a molded article thereof were obtained and evaluated in the same manner as in Example 1, except that a sheet article in which the carbon fibers were concentrically oriented was obtained by stirring the aqueous surfactant solution, in which the cut carbon fibers (A-1) were loaded, for 10 minutes using the uniaxial stirrer and directly subjecting the resulting aqueous solution to dehydration and treatment.

Example 12

A molded article was obtained in the same manner as in Example 1, except that the carbon fiber-reinforced polypropylene sheet was press-molded at a pressure of 0.8 MPa instead of 5 MPa.

Example 13

A carbon fiber-reinforced polypropylene sheet and a molded article thereof were obtained and evaluated in the same manner as in Example 1, except that the 0.1%-by-mass aqueous surfactant solution was used in an amount of 6 L instead of 8 L.

Example 14

A carbon fiber-reinforced polypropylene sheet and a molded article thereof were obtained and evaluated in the same manner as in Example 1, except that the resin sheet prepared in Reference Example 12 was used in place of the resin sheet prepared in Reference Example 4.

Example 15

A carbon fiber-reinforced polypropylene sheet and a molded article thereof were obtained and evaluated in the same manner as in Example 2, except that the carbon fibers (A-1) were cut at a length of 5.5 mm instead of 6 mm.

Example 16

A carbon fiber-reinforced polypropylene sheet and a molded article thereof were obtained and evaluated in the same manner as in Example 2, except that the 0.1%-by-mass aqueous surfactant solution was used in an amount of 6 L instead of 8 L.

Comparative Example 1

A carbon fiber-reinforced polypropylene sheet and a molded article thereof were obtained and evaluated in the same manner as in Example 1, except that the resin sheet prepared in Reference Example 7 was used in place of the resin sheet prepared in Reference Example 2.

Comparative Example 2

A carbon fiber-reinforced polypropylene sheet and a molded article thereof were obtained and evaluated in the same manner as in Example 1, except that the resin sheet prepared in Reference Example 9 was used in place of the resin sheet prepared in Reference Example 2.

Comparative Example 3

A carbon fiber-reinforced polypropylene sheet and a molded article thereof were obtained and evaluated in the same manner as in Example 1, except that the carbon fibers (A-1) were cut at a length of 1.3 mm instead of 6 mm.

Comparative Example 4

A carbon fiber-reinforced polypropylene sheet and a molded article thereof were obtained and evaluated in the same manner as in Example 1, except that the carbon fibers (A-1) were cut at a length of 30 mm instead of 6 mm.

Comparative Example 5

A carbon fiber-reinforced polypropylene sheet and a molded article thereof were obtained and evaluated in the same manner as in Example 1, except that the 0.1%-by-mass aqueous surfactant solution was used in an amount of 5 L instead of 8 L.

Comparative Example 6

To a cylindrical container having an inner diameter of 200 mm, 5 g of a surfactant (polyethylene glycol lauryl ether, manufactured by Nacalai Tesque, Inc.) was loaded, and tap water was poured into the cylindrical container to a combined volume of 5 L, thereby obtaining a 0.1%-by-mass aqueous surfactant solution. To this aqueous surfactant solution, 19 g of carbon fibers (A-1), which were cut at a length of 6 mm using a cartridge cutter, was loaded, and the resulting aqueous solution was stirred for 10 minutes using a uniaxial stirrer. After confirming that the carbon fibers were sufficiently dispersed, the aqueous surfactant solution was mixed up and down several times such that the fibers were randomly oriented. The aqueous solution was then subjected to a dehydration treatment and dried at a temperature of 140° C. for 10 minutes to obtain a sheet article of the carbon fibers. The thus obtained sheet article was in the form of a circle having a diameter of 200 mm and had a basis weight of 600 g/m². Here, the mass of this sheet article of carbon fibers, $W_1'$ (g), was also measured.

Next, the sheet article of carbon fibers prepared in the above was immersed for 1 minute in a liquid bath containing 50 cc of an emulsion (C-1) which had been prepared in advance as a 5%-by-mass solution. Then, the sheet article of carbon fibers was taken out of the liquid bath, subjected to a dehydration treatment, and further dried at a temperature of 140° C. for 10 minutes. Here, the mass of the sheet article of carbon fibers, $W_2'$ (g), was also measured. When the amount of the added (C-1), $W_3'$ (g), was calculated using the equation $(W_2'-W_1')$, it was found to be 0.8 g.

Thereafter, on each of the top and bottom surfaces of the thus obtained sheet article of the carbon fibers, one resin sheet prepared in Reference Example 10 was laminated. The resulting laminate in which the sheet article was sandwiched by a total of two resin sheets was then set on a stainless-steel tool plate and pressed for 5 minutes at a press temperature of 220° C. and a pressure of 5 MPa, thereby obtaining a carbon fiber-reinforced polypropylene sheet. The above-described resin sheet was adjusted to have a carbon fiber volume content of 30%. Also, the thickness of the sheet-form molding material was adjusted to be 1.1 mm using a 1.1-mm spacer.

The thus obtained carbon fiber-reinforced polypropylene sheet was cut into a size of 150 mm×150 mm and this was laminated in 3 layers. The resulting laminate was set on a pressing plate die (150 mm×150 mm) and press-molded for 5 minutes at a press temperature of 220° C. and a pressure of 5 MPa using a press machine. Thereafter, while keeping the laminate pressed by the press machine, the laminate was allowed to naturally cool to a room temperature of 25° C. to obtain a molded article. Here, the thickness of the molded article was adjusted to be 3.2 mm using a 3.2-mm spacer. The thus obtained molded article was cut out into a prescribed size and evaluated.

Comparative Example 7

A carbon fiber-reinforced polypropylene sheet and a molded article thereof were obtained and evaluated in the same manner as in Example 1, except that the resin sheet prepared in Reference Example 10 was used in place of the resin sheet prepared in Reference Example 4.

Comparative Example 8

A carbon fiber-reinforced polypropylene sheet and a molded article thereof were obtained and evaluated in the same manner as in Example 7, except that the resin sheet prepared in Reference Example 10 was used in place of the resin sheet prepared in Reference Example 4.

Comparative Example 9

A carbon fiber-reinforced polypropylene sheet and a molded article thereof were obtained and evaluated in the same manner as in Example 6, except that the resin sheet prepared in Reference Example 10 was used in place of the resin sheet prepared in Reference Example 4.

Comparative Example 10

A carbon fiber-reinforced polypropylene sheet and a molded article thereof were obtained and evaluated in the same manner as in Example 2, except that the carbon fibers (A-1) were cut at a length of 1.3 mm instead of 6 mm.

Comparative Example 11

A carbon fiber-reinforced polypropylene sheet and a molded article thereof were obtained and evaluated in the same manner as in Example 3, except that the carbon fibers (A-1) were cut at a length of 1.3 mm instead of 6 mm.

Comparative Example 12

A carbon fiber-reinforced polypropylene sheet and a molded article thereof were obtained and evaluated in the same manner as in Example 2, except that the 0.1%-by-mass aqueous surfactant solution was used in an amount of 5 L instead of 8 L.

Comparative Example 13

A carbon fiber-reinforced polypropylene sheet and a molded article thereof were obtained and evaluated in the same manner as in Example 3, except that the 0.1%-by-mass aqueous surfactant solution was used in an amount of 5 L instead of 8 L.

The properties that were measured in Examples 1 to 16 and Comparative Examples 1 to 13 are summarized in Tables 1 to 3.

TABLE 1

| No. | | | Example 1 | Example 2 | Example 3 | Example 4 | Example 5 | Example 6 | Example 7 | Example 8 |
|---|---|---|---|---|---|---|---|---|---|---|
| Weight average fiber length | | mm | 4.9 | 4.9 | 4.9 | 4.7 | 4.3 | 1.6 | 18 | 5.2 |
| Degree of fiber dispersion | Value | % | 97 | 97 | 97 | 97 | 97 | 98 | 92 | 98 |
| | Evaluation | — | A | A | A | A | A | A | B | A |
| Interfacial shear strength (IFSS) | | Mpa | 8.20 | 6.20 | 10.5 | 8.20 | 8.20 | 8.20 | 8.20 | 8.20 |
| Acid-modified polypropylene amount | | % by mass | 3 | 0.1 | 5 | 3 | 3 | 3 | 3 | 3 |
| Fiber length distribution | <2 mm | % by mass | 3.9 | 3.9 | 3.9 | 12 | 28 | 80 | 0.20 | 2.1 |
| | 5 mm< | % by mass | 64 | 64 | 64 | 43 | 18 | 13 | 80 | 64 |
| Orientation angles distribution | Maximum of relative frequency | — | 0.18 | 0.18 | 0.18 | 0.18 | 0.18 | 0.18 | 0.22 | 0.18 |
| | Evaluation | — | A | A | A | A | A | A | B | A |
| | Minimum of relative frequency | — | 0.15 | 0.15 | 0.15 | 0.15 | 0.15 | 0.15 | 0.11 | 0.15 |
| | Evaluation | — | A | A | A | A | A | A | B | A |
| Volume content of carbon fibers | | % by volume | 20 | 20 | 20 | 20 | 20 | 20 | 20 | 10 |
| Void ratio | Value | % by volume | 1 | 1 | 1 | 1 | 1 | 0.4 | 6 | 0.3 |
| | Evaluation (Void ratio) | — | A | A | A | A | A | A | B | A |
| Mechanical properties | Bending strength | MPa | 252 | 218 | 280 | 230 | 211 | 202 | 249 | 210 |
| | Evaluation (Bending strength) | — | B | C | B | C | C | C | C | B |
| | $CV_b$ | % | 1.8 | 1.7 | 2.0 | 2.1 | 1.8 | 1.6 | 4.3 | 2.1 |
| | Evaluation (CVb) | — | A | A | A | A | A | A | B | A |
| | Izod impact strength | J/m | 360 | 533 | 260 | 312 | 289 | 220 | 380 | 280 |
| | Evaluation | — | B | A | C | C | C | C | B | C |
| | $CV_i$ | % | 3.1 | 3.0 | 3.2 | 2.9 | 3.0 | 2.6 | 5.2 | 3.1 |
| | Evaluation (CVi) | — | A | A | A | A | A | A | B | A |

TABLE 2

| | No. | | Example 9 | Example 10 | Example 11 | Example 12 | Example 13 | Example 14 | Example 15 | Example 16 |
|---|---|---|---|---|---|---|---|---|---|---|
| Weight average fiber length | | mm | 3.6 | 1.8 | 4.9 | 4.9 | 4.9 | 4.9 | 4.7 | 4.9 |
| Degree of fiber dispersion | Value | % | 94 | 91 | 97 | 97 | 91 | 97 | 97 | 91 |
| | Evaluation | — | B | B | A | A | B | A | A | B |
| Interfacial shear strength (IFSS) | | Mpa | 8.20 | 8.20 | 8.20 | 8.20 | 8.20 | 7.00 | 6.20 | 6.20 |
| Acid-modified polypropylene amount | | % by mass | 3 | 3 | 3 | 3 | 3 | 1 | 0.1 | 0.1 |
| Fiber length distribution | <2 mm | % by mass | 24 | 82 | 3.9 | 3.9 | 3.9 | 4.2 | 14 | 3.0 |
| | 5 mm< | % by mass | 26 | 0 | 64 | 64 | 64 | 69 | 46 | 65 |
| Orientation angles distribution | Maximum of relative frequency | — | 0.18 | 0.18 | 0.27 | 0.18 | 0.23 | 0.18 | 0.18 | 0.23 |
| | Evaluation | — | A | A | C | A | B | A | A | B |
| | Minimum of relative frequency | — | 0.15 | 0.15 | 0.080 | 0.15 | 0.13 | 0.15 | 0.15 | 0.11 |
| | Evaluation | — | A | A | C | A | A | A | A | B |
| Volume content of carbon fibers | | % by volume | 31 | 40 | 20 | 20 | 20 | 20 | 20 | 20 |
| Void ratio | Value | % by volume | 1 | 5 | 1 | 5 | 1 | 1 | 1 | 1 |
| | Evaluation (Void ratio) | — | A | B | A | B | A | A | A | A |
| Mechanical properties | Bending strength | MPa | 320 | 325 | 233 | 211 | 210 | 235 | 210 | 203 |
| | Evaluation (Bending strength) | — | B | B | C | C | C | C | C | C |
| | $CV_b$ | % | 2.0 | 3.8 | 11 | 4.0 | 2.4 | 1.8 | 2.1 | 3.8 |
| | Evaluation (CVb) | — | A | A | C | B | A | A | A | A |
| | Izod impact strength | J/m | 410 | 401 | 332 | 298 | 320 | 430 | 390 | 480 |
| | Evaluation | — | C | C | B | C | B | A | B | A |
| | $CV_i$ | % | 2.8 | 4.9 | 18 | 4.4 | 3.5 | 1.2 | 2.9 | 3.9 |
| | Evaluation (CVi) | — | A | B | C | B | A | A | A | A |

TABLE 3

| | No. | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Weight average fiber length | | mm | 4.9 | 4.9 | 1.1 | 25 | 4.9 | 3.6 | 4.9 |
| Degree of fiber dispersion | Value | % | 97 | 97 | 99 | 78 | 85 | 62 | 97 |
| | Evaluation | — | A | A | A | C | C | C | A |
| Interfacial shear strength (IFSS) | | Mpa | 5.20 | 13.3 | 8.20 | 8.20 | 8.20 | 16.6 | 16.6 |
| Acid-modified polypropylene amount | | % by mass | 0 | 10 | 3 | 3 | 3 | 100 | 100 |
| Fiber length distribution | <2 mm | % by mass | 3.9 | 3.9 | 100 | 0.20 | 3.9 | 24 | 3.9 |
| | 5 mm< | % by mass | 64 | 64 | 0 | 98 | 64 | 26 | 64 |
| Orientation angles distribution | Maximum of relative frequency | — | 0.18 | 0.18 | 0.18 | 0.24 | 0.28 | 0.30 | 0.18 |
| | Evaluation | — | A | A | A | B | C | C | A |
| | Minimum of relative frequency | — | 0.15 | 0.15 | 0.15 | 0.12 | 0.070 | 0.050 | 0.15 |
| | Evaluation | — | A | A | A | A | C | C | A |
| Volume content of carbon fibers | | % by volume | 20 | 20 | 20 | 20 | 20 | 30 | 20 |
| Void ratio | Value | % by volume | 1 | 1 | 0.2 | 20 | 1 | 1 | 1 |
| | Evaluation (Void ratio) | — | A | A | A | C | A | A | A |
| Mechanical properties | Bending strength | MPa | 140 | 305 | 180 | 180 | 190 | 245 | 302 |
| | Evaluation (Bending strength) | — | E | A | D | D | D | D | A |
| | $CV_b$ | % | 1.9 | 2.2 | 0.80 | 4.5 | 12 | 17 | 2.2 |
| | Evaluation (CVb) | — | A | A | A | B | C | C | A |
| | Izod impact strength | J/m | 520 | 132 | 140 | 240 | 310 | 310 | 128 |
| | Evaluation | — | A | D | D | B | B | D | D |
| | $CV_i$ | % | 3.2 | 2.1 | 2.1 | 6.0 | 14 | 21 | 3.2 |
| | Evaluation (CVi) | — | A | A | A | B | C | C | A |

TABLE 3-continued

| No. | | | Comparative Example 8 | Comparative Example 9 | Comparative Example 10 | Comparative Example 11 | Comparative Example 12 |
|---|---|---|---|---|---|---|---|
| Weight average fiber length | | mm | 18 | 1.6 | 1.1 | 1.1 | 4.9 |
| Degree of fiber dispersion | Value | % | 92 | 98 | 99 | 99 | 85 |
| | Evaluation | — | B | A | A | A | C |
| Interfacial shear strength (IFSS) | | Mpa | 16.6 | 16.6 | 6.20 | 10.5 | 6.20 |
| Acid-modified polypropylene amount | | % by mass | 100 | 100 | 0.1 | 5 | 0.1 |
| Fiber length distribution | <2 mm | % by mass | 0.20 | 80 | 100 | 100 | 3.2 |
| | 5 mm< | % by mass | 80 | 13 | 0 | 0 | 65 |
| Orientation angles distribution | Maximum of relative frequency | — | 0.22 | 0.18 | 0.18 | 0.18 | 0.28 |
| | Evaluation | — | B | A | A | A | C |
| | Minimum of relative frequency | — | 0.11 | 0.15 | 0.15 | 0.15 | 0.070 |
| | Evaluation | — | B | A | A | A | C |
| Volume content of carbon fibers | | % by volume | 20 | 20 | 20 | 20 | 20 |
| Void ratio | Value | % by volume | 6 | 0.4 | 0.2 | 0.2 | 1 |
| | Evaluation (Void ratio) | — | B | A | A | A | A |
| Mechanical properties | Bending strength | MPa | 298 | 230 | 163 | 192 | 170 |
| | Evaluation (Bending strength) | — | B | C | D | D | D |
| | $CV_b$ | % | 2.2 | 2.2 | 0.80 | 0.70 | 12 |
| | Evaluation (CVb) | — | A | A | A | A | C |
| | Izod impact strength | J/m | 130 | 120 | 130 | 160 | 380 |
| | Evaluation | — | D | D | D | D | B |
| | $CV_i$ | % | 2.8 | 3.3 | 1.4 | 1.4 | 14 |
| | Evaluation (CVi) | — | A | A | A | A | C |

From Tables 1 to 3, the followings are apparent.

An excellent balance of bending strength and Izod impact strength was attained in Examples 1, 2, 3 and 14. Thereamong, in Example 1, a molded article having a superior balance of bending strength and Izod impact strength was obtained. In addition, a molded article having a superior Izod impact strength was obtained in Examples 2 and 14, and a molded article having a superior bending strength was obtained in Example 3.

It is seen that a superior balance of bending strength and Izod impact strength was attained in Example 1 as compared to Examples 4, 5 and 6; and that a superior balance of bending strength and Izod impact strength was also attained in Example 2 as compared to Example 15. This is attributed to that, according to the mass distribution of the fiber length, in Examples 1 and 2, the mass ratio of the fibers having a length of less than 2 mm was low and that of the fibers having a length of 5 mm or greater was high.

It is seen that a superior balance of bending strength and Izod impact strength was attained in Example 1 as compared to Example 7. In Example 7, because the mass ratio of the fibers having a length of less than 2 mm was particularly low and that of the fibers having a length of 5 mm or greater was particularly high, the volume expansion during overheating was large, which led to a high void ratio in the molded article. Consequently, the bending strength and the Izod impact strength were both reduced.

The molded articles of 1, 8, 9 and 10 had an excellent balance of bending strength and Izod impact strength regardless of the level of the $V_f$. However, since the $V_f$ of the molded article of Example 8 is 10% and the absolute values of the bending strength and Izod impact strength are thus small, the application of the molded article of Example 8 is limited. Moreover, in the molded article of Example 10, since the absolute values of the attainable bending strength and Izod impact strength are small in relation to the $V_f$, the application thereof is also limited.

It is seen that the coefficient of variation of the bending strength and that of the Izod impact strength were both lower in Example 1 than in Example 11. This is because, in the molded article of Example 1, the relative frequency of the orientation angles of the carbon fibers was 0.90 to 0.25. In the molded article of Example 1, since the orientation angles of the carbon fibers were random, the bending strength and the Izod impact strength were both substantially constant regardless of the positions where the test pieces were cut out from the molded article.

It is seen that a superior balance of bending strength and Izod impact strength was attained in Example 1 as compared to Example 12. This is because the void ratio was low in the molded article of Example 1. Since the number of voids that serve as starting points of breakage was small, a molded article having high bending strength and high Izod impact strength was obtained.

It is seen that a superior balance of bending strength and Izod impact strength was attained in Example 1 as compared to Example 13 and Comparative Example 5. This is because the degree of dispersion of the carbon fibers was high in the molded article of Example 1. By allowing the carbon fibers to be dispersed in the form of single fibers in the molded article, the molded article attained a large interfacial area between the carbon fibers and polypropylene and excellent Izod impact strength.

It is seen that a superior balance of bending strength and Izod impact strength was attained in Example 2 as compared to Example 15. This is attributed to that, according to the mass distribution of the fiber length, in Example 2, the mass ratio of the fibers having a length of less than 2 mm was low and that of the fibers having a length of 5 mm or greater was high.

It is seen that a superior balance of bending strength and Izod impact strength was attained in Example 2 as compared to Example 16. This is because the degree of dispersion of the carbon fibers was high in the molded article of Example 2. By allowing the carbon fibers to be dispersed in the form of single fibers in the molded article, the molded article attained a large interfacial area between the carbon fibers and polypropylene and excellent Izod impact strength.

It is seen that a superior balance of bending strength and Izod impact strength was attained in Examples 1, 2, 3 and 14 as compared to Comparative Examples 1, 2 and 7. This is because the IFSS was at an appropriate level, being neither too high nor too low in Examples 1, 2, 3 and 14. In Comparative Example 1, since the IFSS was low at 5.20 MPa, a molded article having a high impact resistance but a notably low bending strength was obtained. In Comparative Examples 2 and 7, since the IFSS was high at 13.3 MPa and 16.6 MPa, respectively, molded articles having a high bending strength but a low Izod impact strength were obtained.

It is seen that a superior balance of bending strength and Izod impact strength was attained in Examples 1 and 4 to 7 as compared to Comparative Examples 3 and 4. This is because, in Examples 1 and 4 to 7, by maintaining the reinforcing effect of the carbon fibers and controlling the weight-average fiber length in a range where the shapability was not impaired, the molded articles were allowed to have high bending strength and Izod impact strength. In Comparative Example 3, since the weight-average fiber length of the carbon fibers was short, sufficient reinforcing effect was not attained, so that the bending strength and the Izod impact strength were both reduced. Further, in Comparative Example 4, since the weight-average fiber length of the carbon fibers was long, the volume expansion during overheating was large and this lead to a high void ratio in the molded article. Consequently, the bending strength and the Izod impact strength were both reduced.

It is seen that a superior balance of bending strength and Izod impact strength was attained in Example 1 as compared to Comparative Example 6. This is because, in the molded article of Comparative Example 6, the carbon fibers were in the form of bundles and the IFSS was thus high at 16.6 MPa.

It is seen that a superior balance of bending strength and Izod impact strength was attained in Example 7 as compared to Comparative Example 8. In Comparative Example 8, since the IFSS was high at 16.6 MPa, a molded article having a high bending strength but a low Izod impact strength was obtained.

It is seen that a superior balance of bending strength and Izod impact strength was attained in Example 6 as compared to Comparative Example 9. In Comparative Example 9, since the IFSS was high at 16.6 MPa, a molded article having a high bending strength but a low Izod impact strength was obtained.

It is seen that a superior balance of bending strength and Izod impact strength was attained in Examples 1, 2, 3 and 14 as compared to Comparative Examples 3, 10 and 11. This is because the weight-average fiber length was an appropriate value in Examples 1, 2, 3 and 14. In Comparative Examples 3, 10 and 11, since the weight-average fiber length was short at 1.10 mm, sufficient reinforcing effect by the fibers was not attained, so that molded articles having low bending strength and Izod impact strength were obtained.

It is seen that a superior balance of bending strength and Izod impact strength was attained in Examples 2 and 3 as compared to Comparative Examples 12 and 13, respectively. This is because the degree of dispersion of the carbon fibers was high in the molded articles of Example 2 and 3. By allowing the carbon fibers to be dispersed in the form of single fibers in the respective molded articles, excellent molded articles having a large interfacial area between the carbon fibers and polypropylene and a low Izod impact strength were obtained.

INDUSTRIAL APPLICABILITY

The carbon fiber-reinforced polypropylene sheet according to the present invention is suitable for obtaining an excellent molded article having both strength and impact resistance. Further, in a molded article obtained by using this carbon fiber-reinforced polypropylene sheet, since carbon fibers are two-dimensionally oriented in an isotropic manner, the reinforcing effect is excellent in the planar direction and the mechanical properties have little variation; therefore, the molded article can be applied in a wide range of industrial fields of, for example, members, parts and chassis of electric and electronic instruments, robots, two-wheel vehicles, automobiles and aircrafts.

The invention claimed is:

1. A carbon fiber-reinforced polypropylene sheet, comprising carbon fibers having a weight-average fiber length of 1.5 mm to 20 mm and a matrix resin composed of a polypropylene and an acid-modified polypropylene, wherein
said carbon fibers are dispersed in the form of single fibers;
said matrix resin comprises said acid-modified polypropylene in an amount of 0.1 to 5% by mass;
the interfacial shear strength between said carbon fibers and said matrix resin is 5.50 to 10.5 Mpa; and
said carbon fibers contained therein comprise 20% by mass to 75% by mass of carbon fibers having a length of greater than 5 mm and 1.0% by mass to 25% by mass of carbon fibers having a length of less than 2 mm.

2. The carbon fiber-reinforced polypropylene sheet according to claim 1, wherein
said carbon fibers contained therein comprise 50% by mass to 70% by mass of carbon fibers having a length of greater than 5 mm and 1.0% by mass to 10% by mass of carbon fibers having a length of less than 2 mm.

3. The carbon fiber-reinforced polypropylene sheet according to claim 1, wherein
in the frequency distribution of two-dimensional orientation angles of said carbon fibers, the 30°-interval relative frequency has a maximum value of 0.25 or smaller and a minimum value of 0.090 or larger.

4. The carbon fiber-reinforced polypropylene sheet according to claim 1, wherein
the volume content of said carbon fibers is 10 to 40%.

5. A molded article, obtained by molding the carbon fiber-reinforced polypropylene sheet according to claim 1.

6. The molded article according to claim 5, wherein
the void ratio is not higher than 3%.

7. The carbon fiber-reinforced polypropylene sheet according to claim 2, wherein
the volume content of said carbon fibers is 10 to 40%.

8. The carbon fiber-reinforced polypropylene sheet according to claim 3, wherein
the volume content of said carbon fibers is 10 to 40%.

9. A molded article, obtained by molding the carbon fiber-reinforced polypropylene sheet according to claim 2.

* * * * *